Patented Nov. 26, 1935

2,022,064

UNITED STATES PATENT OFFICE 2,022,064

OPAQUE MATERIAL

Roger N. Wallach, Briarcliff Manor, N. Y., assignor to Sylvania Industrial Corporation, Fredericksburg, Va., a corporation of Virginia No Drawing. Application March 24, 1932, Serial No. 600,975

18 Claims. (Cl. 154—46)

The invention relates to opaque material as an article of manufacture, and to a process for its manufacture, and more particularly to opaque sheets, strips or ribbons having as a base a transparent material. It relates especially to an opaque sheet comprising a transparent, non-fibrous homogeneous material.

Sheets and strips of material, such as cellulose derivatives, celluloid, casein, gelatin, poly-vinyl compounds, artificial and natural resins and the like, possessing a high degree of brilliancy and transparency, have been employed in the wrapping and/or display arts. However, for some purposes, such as in decorative millinery, drawing, painting, printing, photographic and lithographic work, a sheet having a dull matte or satin-like finish has been found most suitable by reason of the lack of brilliancy and the fineness of the grain.

It has heretofore been the practice when forming satin-like or matte finished sheets from a composition such as, for instance, regenerated cellulose, to introduce oil, pigment, coloring agent or other opaqueing material in a finely divided condition into the sheet during manufacture as, for example, into a viscose solution which is subsequently cast and converted in the usual manner. A sheet formed by this method possesses the characteristics of a satin-finish and matte effect, but it has a low tensile strength, decreased resilience and flexibility, and it is not materially resistant to folding, bending, creasing, etc., and damage by handling.

It is an object of the present invention to provide a material that overcomes these disadvantages.

Another object of the invention is to provide an opaque material that is strong, and while stiff enough to resist permanent deformation by bending, creasing, crimping etc. it is yet flexible to a high degree.

It is a further object of the invention to provide an opaque sheet having a base of clear transparent character, the opacity being effected by the lamination of opaque sheet material therewith or the application of an opaque coating to such transparent base.

It is a specific object of the invention to provide an opaque material consisting of a sheet of regenerated cellulose laminated with opaqued sheets of regenerated cellulose and a process whereby such a material may be manufactured.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

In the practice of the invention, an opaque material may be manufactured which has as a base a transparent non-fibrous material desirably in sheet form and which is rendered opaque by carrying or having upon its surface a layer of opaqueing material. Preferably, the present material has a sheet of a transparent material as a base, and opaque sheets, or films of normally transparent non-fibrous material are laminated or otherwise applied thereto, preferably on each side, such latter sheets or films having had previously incorporated therewith a softening agent such as glycerin, or a plasticizer, or the like to render them flexible.

More specifically, the opaque material of the invention may be formed from a sheet of clear, transparent regenerated cellulose, or other non-fibrous, homogeneous material, which may or may not, as desired, be provided with a coating of a moistureproof, flexible, non-tacky composition. A sheet or sheets of opaque material likewise formed from a homogeneous non-fibrous plastic material, such as regenerated cellulose, may be applied to the basic transparent sheet in laminated relation. The application may be accomplished by suitable apparatus known to the art, such as a series of three vertically spaced feed rolls which feed three strips of material into longitudinal alignment with each other, one or more of the sheets, preferably the center one, passing through a bath containing a suitable adhesive. The lamination, while having been described with the grains of the respective sheets in alignment, may be effected by laminating the sheets with the grain of one sheet at an angle to the grain of the adjacent sheet, as is well known in the art of laminating. The super-imposed sheets are then passed through squeegee rolls and dried in any suitable manner known to the art to secure the final laminated product. Any suitable adhesive may be employed in fastening the respective sheets of material together, e. g., gums, glues, starchy materials, such as dextrin, lacquers, varnishes, and the like.

In a preferred embodiment, the opaque material consists of three sheets in laminated relation, the article being formed by laminating a sheet of regenerated cellulose on each side with a sheet of regenerated cellulose impregnated with a compound rendering it opaque. This embodiment is particularly adapted for use in stiffening, decorating or ornamenting hats and the like.

If the basic sheet of transparent material is provided with a heat-fluxible coating which may be moistureproof, adhesion of the superimposed layers may readily be secured by the application of heat, the coating composition causing the contiguous surfaces to adhere to form a substantially permanent union.

The opaque sheets of material, for example, regenerated cellulose, may be formed in a number of ways, the following being preferred. A pigment or filler, such as a mineral oil, vegetable oil, organic or inorganic compound, is introduced into the viscose solution and thoroughly mixed therewith. The viscose is then cast, converted, desulphurized, washed, bleached, glycerinated, and processed in the usual manner.

As a pigment or filler of the vegetable oil type, castor oil is typical. Among the mineral oils, kerosene, tetraline, hydronaphthalene, and kerosene and petroleum jelly or mixtures of two or more thereof have been found suitable. Halogen derivatives of organic compounds, such as mono- and dichlorbenzol, may also be used. Among the inorganic compounds, titanium oxide has been employed with success. Paraffin oil, various waxes, aniline and nitrobenzol have also been found suitable for the production of an opaque material having a satin-like finish. Further, a colored pigment may be chosen to give any desired color to the finished product.

It will be realized that the degree of opacity will depend upon the nature, amount and state of subdivision or distribution of the pigment or filler incorporated in the sheet material. For low opacity or high translucence, I prefer to use an oil as the filling material. For a greater degree of opacity, wax, petroleum jelly or heavy hydrocarbons, either singly or in admixture, may be incorporated in the material. For the preparation of a very dense or perfectly opaque material, I prefer to use a black or dark pigment or a large quantity of a solid mineral filler, such as titanium oxide.

The term "opaque material" as used in the specification and in the appended claims is intended to include sheet material which is translucent, as well as sheet material which will not permit the passage of light therethrough.

The non-fibrous, homogeneous material used in producing the article of the present invention includes cellulosic material, e. g., regenerated cellulose, cellulose derivatives such as cellulose nitrate, ethyl cellulose, etc., gelatin, casein, etc., and synthetic or natural resins in sheet form, such as a sheet or film comprising a poly-vinyl resin.

The opaque materials produced in accordance with the foregoing procedures have a dull finish and a fine grain, are much stronger than the ordinary sheet of opaque homogeneous material, and are capable of being worked and handled without material bursting, rupture or tearing.

Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. As an article of manufacture, a flexible opaque material comprising a transparent sheet of a non-fibrous material laminated with a sheet of a normally transparent non-fibrous material which has been impregnated with a substance rendering it opaque and imparting thereto a matte appearance.

2. As an article of manufacture, a flexible opaque material comprising a transparent sheet of a non-fibrous material laminated on each side with a sheet formed from a normally transparent non-fibrous material which has been impregnated with a substance rendering it opaque and imparting thereto a matte appearance.

3. As an article of manufacture, a flexible opaque material comprising a transparent sheet of regenerated cellulose laminated with a sheet formed from a non-fibrous cellulosic material impregnated with a substance rendering it opaque and imparting thereto a matte appearance.

4. As an article of manufacture, a flexible opaque material comprising a transparent sheet of regenerated cellulose laminated with a sheet of regenerated cellulose impregnated with a substance rendering it opaque and imparting thereto a matte apperance.

5. As an article of manufacture, a flexible opaque material comprising a transparent sheet of regenerated cellulose laminated on each side with a sheet of regenerated cellulose impregnated with a substance rendering it opaque and imparting thereto a matte appearance.

6. As an article of manufacture, a flexible opaque material comprising a transparent sheet formed from a poly-vinyl compound laminated with a non-fibrous cellulosic material impregnated with a substance rendering it opaque and imparting thereto a matte appearance.

7. As an article of manufacture, a flexible opaque material comprising a transparent sheet formed from a poly-vinyl compound laminated with a sheet formed from a non-fibrous, homogeneous material impregnated with a substance rendering it opaque and imparting thereto a matte appearance.

8. As an article of manufacture, a flexible opaque material comprising a transparent sheet formed from gelatin laminated with a non-fibrous cellulosic material impregnated with a substance rendering it opaque and imparting thereto a matte appearance.

9. As an article of manufacture, a flexible opaque material comprising a transparent sheet formed from gelatin laminated with a sheet of a non-fibrous, homogeneous material impregnated with a substance rendering it opaque and imparting thereto a matte appearance.

10. As an article of manufacture, a flexible, opaque material comprising a flexible sheet of a transparent material laminated with a flexible sheet of a normally transparent non-fibrous material which has been combined with a substance rendering said sheet opaque and imparting thereto a matte appearance.

11. As an article of manufacture, a flexible, opaque material comprising a flexible sheet of a transparent material laminated on each side with a flexible sheet of non-fibrous plastic material combined with a substance imparting thereto a matte appearance.

12. A flexible millinery material comprising a flexible sheet of a transparent material laminated with a non-fibrous, opaque sheet of a normally transparent material which has been combined with a substance rendering said sheet opaque and imparting thereto a matte appearance.

13. As a millinery material, a flexible ribbon comprising a flexible sheet of a transparent material laminated on each side with a flexible sheet of non-fibrous plastic material combined with a substance imparting thereto a matte appearance.

14. As a millinery material, a flexible ribbon comprising a transparent sheet of regenerated cellulose laminated with a sheet of regenerated cellulose combined with a substance rendering it opaque and imparting thereto a matte appearance.

15. As an article of manufacture, a flexible material comprising a flexible sheet of transparent material laminated with a flexible sheet of non-fibrous opaque plastic material having a matte appearance, the contiguous surfaces of said sheets being held together by a layer of heat-fusible material located between said sheets.

16. As an article of manufacture, a flexible material comprising a flexible sheet of transparent material laminated on each side with a flexible sheet of non-fibrous, opaque plastic material impregnated with a substance imparting thereto a matte appearance, the contiguous surfaces of said sheets being held together by a layer of heat-fusible material located between said sheets.

17. As an article of manufacture, a flexible material comprising a transparent sheet of regenerated cellulose having on each side a heat-fusible coating and laminated on each side with a sheet of regenerated cellulose impregnated with a substance rendering it opaque and imparting thereto a matte appearance, said sheets being held together by the heat-fusible coating.

18. As an article of manufacture, a flexible opaque material comprising a transparent sheet of regenerated cellulose laminated with a sheet formed from a non-fibrous material impregnated with a substance rendering it opaque and imparting thereto a matte appearance.

ROGER N. WALLACH.